(12) United States Patent
Laukemann (10) Patent No.: US 7,341,026 B2
(45) Date of Patent: Mar. 11, 2008

(54) PROPULSION SYSTEM AND METHOD FOR OPTIMISING POWER SUPPLY TO THE COOLING SYSTEM THEREOF

(75) Inventor: Dieter Laukemann, Vellberg (DE)

(73) Assignee: Voith Turbo GmbH & Co. KG., Heidenheim (DE)

( * ) Notice: Subject to any disclaimer, the term of this patent is extended or adjusted under 35 U.S.C. 154(b) by 0 days.

(21) Appl. No.: 10/552,108

(22) PCT Filed: Mar. 27, 2004

(86) PCT No.: PCT/EP2004/003273
§ 371 (c)(1),
(2), (4) Date: Sep. 21, 2006

(87) PCT Pub. No.: WO2004/088104
PCT Pub. Date: Oct. 14, 2004

(65) Prior Publication Data
US 2007/0006826 A1    Jan. 11, 2007

(30) Foreign Application Priority Data
Apr. 4, 2003    (DE) ................ 103 15 402

(51) Int. Cl.
*F01P 7/02* (2006.01)
(52) U.S. Cl. ............................... 123/41.12
(58) Field of Classification Search .......... 123/41.12
See application file for complete search history.

(56) References Cited
U.S. PATENT DOCUMENTS

| | | | | |
|---|---|---|---|---|
| 2,837,069 A | * | 6/1958 | Nutt | 123/41.12 |
| 3,483,852 A | * | 12/1969 | Newman et al. | 123/41.12 |
| 4,124,001 A | * | 11/1978 | Samuel et al. | 123/41.12 |
| 4,920,929 A | * | 5/1990 | Bishop | 123/41.12 |
| 5,215,044 A | | 6/1993 | Banzhaf et al. | 123/41.29 |
| 5,359,969 A | * | 11/1994 | Dickrell et al. | 123/41.12 |
| 5,947,247 A | | 9/1999 | Cummings, III | 192/70.12 |

(Continued)

FOREIGN PATENT DOCUMENTS
DE        1 101 051        9/1956

(Continued)

OTHER PUBLICATIONS

International Search Report dated Jul. 28, 2004 from PCT/EP2004/003273 German Search Report dated Apr. 6, 2004 from German Appln. No. 103 15 402.7-22.

Primary Examiner—Noah P. Kamen
(74) Attorney, Agent, or Firm—Ohlandt, Greeley, Ruggiero & Perle, L.L.P.

(57) ABSTRACT

A drive train system having a driving engine that has a cooling system for cooling the driving engine is provided. The cooling system has a coolant circuit, a cooling device, and a fan that is associated with the cooling device and that is in driveline connection with the driving engine. A controllable or regulatable clutch is arranged between the driving engine and the fan. The clutch is a hydrodynamic clutch having a primary wheel and a secondary wheel, which jointly form a working chamber that can be filled with a working fluid, and is provided with a working fluid supply system associated with the clutch and with means for influencing the transmission behavior of the hydrodynamic clutch.

10 Claims, 7 Drawing Sheets

U.S. PATENT DOCUMENTS

| | | | |
|---|---|---|---|
| 6,772,714 B2* | 8/2004 | Laird et al. | 123/41.12 |
| 6,894,883 B2* | 5/2005 | Buchholz | 123/41.01 |
| 2002/0016656 A1 | 2/2002 | Chung et al. | 701/36 |

FOREIGN PATENT DOCUMENTS

| | | |
|---|---|---|
| DE | 28 08 660 | 9/1979 |
| DE | 30 18 076 | 11/1981 |
| DE | 100 62 534 | 7/2001 |
| DE | 100 16 435 | 10/2001 |
| EP | 1284344 | 2/2003 |
| FR | 1052737 | 1/1954 |
| GB | 707033 | 4/1954 |
| GB | 824783 | 12/1959 |

* cited by examiner

PROPULSION SYSTEM AND METHOD FOR OPTIMISING POWER SUPPLY TO THE COOLING SYSTEM THEREOF

RELATED APPLICATIONS

This application claims priority in PCT International Application No. PCT/EP2004/003273, filed Mar. 27, 2004, and German Application No. DE 103 15 402.7, filed on Apr. 4, 2003, the disclosures of which are incorporated herein by reference.

BACKGROUND OF THE INVENTION

1. Field of the Invention

The invention relates to a drive train system. The invention further relates to a method for optimizing the power supply for a cooling system for cooling at least one assembly of a drive train system.

2. Description of the Related Art

Drive train systems for stationary or mobile applications, in particular those intended for use in vehicles comprise at least one driving engine, which, in cases of mobile application, is constructed, as a rule, as an internal combustion engine. These systems require, as a rule, a cooling system for dissipating the heat that is produced during the combustion process. As a rule, the cooling system comprises a coolant circuit for carrying a cooling medium, a cooling device, which, as a rule, is constructed as a heat exchanger, and a delivering device for circulating the coolant in the coolant circuit, which, as a rule, is a coolant circulating pump. Further associated with the cooling device is a device, taking the form of a fan or a ventilator, for realizing an optimal heat transfer to the environment and the transport of ambient air. In the known constructions, this fan is driven by the driving engine, in particular by the internal combustion engine. The volume of air that can thereby be supplied to the cooling device is proportional in this case to the speed (rpm) of the engine. A major drawback of this system consists in the slow response time and the inadequate adjustment of the available cooling capacity to the actual need. If too large a volume of air is supplied—that is, at high speed (rpm) of the driving engine—an unnecessarily large amount of power is consequently consumed for driving the fan. If the volume of air is too small, the engine adjusts its power downward. Further known are solutions in which the fan can be switched off or in which it is possible to engage various transmission ratios for driving the fan. These systems are also characterized by a slow response time and inadequate adjustment of the cooling capacity that is supplied through the cooling system to the actual need, which is governed by the drive train assembly or at least by the driving engine.

Other systems are characterized by the use of means for influencing the fan power between the driving engine and the fan. Conceivable are mechanical coupling systems, which close as a function of the temperature of the cooling medium, this resulting in a direct proportionality between the coupling or the applied pressure and the temperature in the cooling system, which is to be regarded as a major drawback of such a system. Thus, the actuating device itself, in particular the manipulated variable, has to be precisely laid out with respect to the temperature that adjusts in the cooling circuit. Furthermore, this system responds to existing temperature values, so that, on the one hand, the full theoretically possible cooling capacity cannot always be supplied by the cooling system and, on the other hand, the adjustment of the cooling capacity occurs with a time delay on account of the inertial response of the system.

SUMMARY OF THE INVENTION

The invention is therefore based on the problem of creating a cooling system that is optimized with respect to the required power consumption and for which the construction of the cooling system and the form of the measures required for it should be characterized by a low design and control engineering expense. In so doing, attention should be paid to compensating for the inertial response of the system to the greatest possible extent according to the solutions that are known from prior art and enabling a quick response to occur to the momentarily adjusting change in cooling power consumption.

The solution of the invention is characterized by the features of claim 1. Advantageous embodiments are presented in the subclaims.

The drive train system having a driving engine, particularly one in the form of an internal combustion engine, comprises a cooling system for cooling at least the driving engine, which comprises a coolant circuit for conducting a cooling medium, and a device for supplying cool ambient air for absorbing heat from the coolant circuit, said device taking the form of a fan or of a ventilator, which is in driveline connection with the driving engine, and a cooling device associated with the coolant circuit. The cooling system further comprises a coolant circulating pump for maintaining a circulating flow in the coolant circuit. In accordance with the invention, a controllable or regulatable clutch, which takes the form of a hydrodynamic clutch, is provided between the driving engine and the fan. When a coolant circulating pump is driven by the driving engine, this hydrodynamic clutch is disposed after the pump. The hydrodynamic clutch comprises a primary blade wheel and a secondary blade wheel, which jointly form a working chamber that can be filled with a working fluid, and the clutch is free of a guide wheel. The primary wheel is connected here at least indirectly, that is, either directly or else by way of additional transmission elements, to the driving engine, whereas the secondary wheel is connected at least indirectly, that is, preferably directly or else by way of additional transmission elements, to the fan, in particular to the drive shaft of the fan. The control of the transmission ratio occurs by way of the hydrodynamic clutch

- as control and/or regulation of the power that can be input by means of the hydrodynamic clutch;
- as control and/or regulation of the torque that can be transmitted by use of the hydrodynamic clutch;
- as control and/or regulation of the speed (rpm) of the secondary wheel.

The filling ratio of the hydrodynamic clutch or else a variable that at least indirectly characterizes it or influences it, serves as the manipulated variable for all of these control and/or regulation functions. The embodiment of the driving engine of the invention offers the advantage that the adjustment of the fan power can be realized in an autarkical manner in relation to the driving engine by changing or else influencing the torque that is transmittable by way of the clutch. The feedback to the driving engine occurs as a function of the power that is to be supplied by the driving engine and that is to be transmitted by way of the clutch, whereby, on account of the adjustability of the transmittable torque, it is possible to vary the speed (rpm) on the power take-off side, that is, the speed (rpm) of the fan drive shaft, and, furthermore, depending on this speed (rpm) and taking into consideration the slip of the clutch due to operation, the speed (rpm) on the power take-off side is adjusted to the speed (rpm) of the driving engine.

There exist a large number of possibilities in regard to the designed construction of the drive train system. When it takes the form of a hydrodynamic clutch, it can be provided with its own working fluid supply system or else it can utilize the cooling system of the driving engine as a working fluid supply system.

In order to realize an arrangement that is as compact as possible and that exploits to the greatest possible extent the components that are present, the possibility according to b) is preferably chosen. In this case, the hydrodynamic clutch is situated in the arrangement in a driveline connection with the crankshaft of the driving engine and with the fan, that is, between the engine and the fan. The arrangement in the cooling system is disposed after the circulating pump, as viewed in the direction of flow of the coolant, the flow into or the flow through the hydrodynamic clutch being controlled or regulated by way of a valve device.

The valve device can be constructed in diverse forms. It involves an adjustable valve device, in which the adjustment occurs in steps or, preferably, continuously. In accordance with an especially advantageous embodiment, at least one proportional valve is used for fine-sensitivity adjustment of the required filling ratio.

For constructions having a separate working fluid supply system, either an open circuit or a closed circuit can be associated with the hydrodynamic clutch. The control or regulation of the filling ratio is performed, as a rule, by way of a pressure control; in the case of a closed circuit, this control or regulation is performed preferably by applying a static superimposed pressure in the circuit. In the case of open circuits, the adjustment of the filling ratio is performed, for example, by way of an appropriately controllable or adjustable filling pump.

In accordance with the invention, a method is proposed for optimizing the cooling power supply for a cooling system for cooling at least one drive train assembly of a drive train system having at least one driving engine and a cooling system associated with it, which comprises a coolant circuit for carrying the coolant and a cooling device for at least indirect cooling of the coolant and a device, associated with the coolant circuit or with the cooling device, that supplies cooled ambient air for absorbing heat from the coolant circuit or from the cooling device and that takes the form of a fan that can be connected to the driving engine in a torsionally rigid manner, in which the volume of air that can be supplied by the fan for absorbing heat is adjusted as a parameter for supplying the required cooling capacity in the cooling system as a function of the current operating parameters at the driving engine and the driving states as well as of at least one variable that characterizes, at least indirectly, the temperature of the cooling medium in the cooling circuit. The fan here is free of a direct, torsionally rigid clutch or of a clutch having fixed, that is, unchangeable transmission ratio in all operating states of the driving engine. The adjustment of the required fan power takes place here either prior to or simultaneously with the actual change in cooling capacity.

Determined from the current operating parameters of the driving engine, a variable that characterizes at least indirectly the temperature in the cooling circuit, and the driving states is the theoretically adjusting change behavior, particularly the change in the cooling capacity of the cooling circuit. Then, from this theoretical change, the fan power that is required for maintaining a specific cooling capacity or else of a cooling capacity range is derived.

The method of the invention makes it possible to adapt the power consumption of the fan in an optimal manner to the circumstances, that is, the coolant capacity demanded by the coolant circuit during a prospective change in the circumstances. There exists no fixed relation between the volume of air supplied by the fan and thus the fan power and the operating state, in particular the speed (rpm) of the driving engine, and accordingly there is also no longer any feedback between the two. Furthermore, an "idling" of the fan, which is characterized by the excessive supply of volumes of air that absorb heat, but which are not at all required for supplying the required cooling capacity, is prevented.

The adjustment of the volume of air to be delivered by the fan for supplying the required cooling capacity is performed here by influencing the speed (rpm) of the fan, because the latter is essentially proportional to the volume of air supplied, because the resistances due to the rotation of the fan are virtually negligible and thus, in essence, a constant torque is produced during drive operation. Because the cooling capacity in the cooling system, in particular in the coolant circuit, is dependent on the volume of air supplied by the fan for absorbing heat directly from the coolant circuit or else from the cooling device, the cooling capacity of the cooling system is accordingly also a function of the speed (rpm) of the fan. In this case, the additional parameters are determined by the cooling capacity supplied by the cooling device. When the cooling device takes the form of a heat exchanger, it is dependent, for example, on the kind and the form of the media or structural components that absorb heat in the cooling device.

Functioning as operating parameters here are at least the temperature of the driving engine and/or the speed (rpm) of the driving engine and/or at least one variable that characterizes these indirectly. Rightly characterizing at least indirectly means, in this context, that there exists a functional relation between the corresponding variables temperature and speed (rpm) and the variables that characterize these indirectly. This relation can be stated in different ways. Here, at least one of the variables mentioned below or a combination of these variables is regarded as a variable that characterizes the operating state or the driving state:

- a variable that characterizes at least indirectly the current operating state of the driving engine
- the activation or the activation of assemblies that influence the driving state
- the position or the actuation of a device for selecting the intent of the driver in order to adjust and/or to change a driving state or the change of these characterizing variables
- when the cooling system of the driving engine is used for cooling additional assemblies of the drive train, the activity of these assemblies and, in addition, the intensity or the cooling capacity required for these assemblies.

In accordance with the invention, the adjustment of the required cooling capacity is performed through speed (rpm) control or regulation of the fan by way of a driveline connection between the fan and the driving engine, means for the control of the transmission ratio being arranged the fan. These means take the form here of a controllable or regulatable clutch. This clutch makes it possible—depending on the kind of construction—to influence the speed (rpm) of the fan through appropriate adjustment of the power input or through the magnitude of the transmittable torque.

In accordance with the invention, the speed (rpm) of the fan can be controlled as well as regulated as a parameter for determining the volume of air supplied for the purpose of cooling. Here, the adjustment in the form of the control or regulation can be integrated as a process into the control and/or regulation of, for example, the cooling capacity of the cooling system or of the temperature of the driving engine or the like. In this instance, the process is a component of the control and/or regulation segment of the overlying control or regulation.

Depending on the design of the working fluid supply system, oil, water, or a coolant functions as working fluid of the clutch.

The drive train system designed in accordance with the invention is suited in an optimal way for the realization of the method of the invention in accordance with claim on account of the free adjustability of the torque that is transmittable by way of the clutch.

BRIEF DESCRIPTION OF THE DRAWINGS

The solution of the invention is explained below on the basis of figures. Depicted therein in detail is the following.

DESCRIPTION OF THE INVENTION

Figure 1:
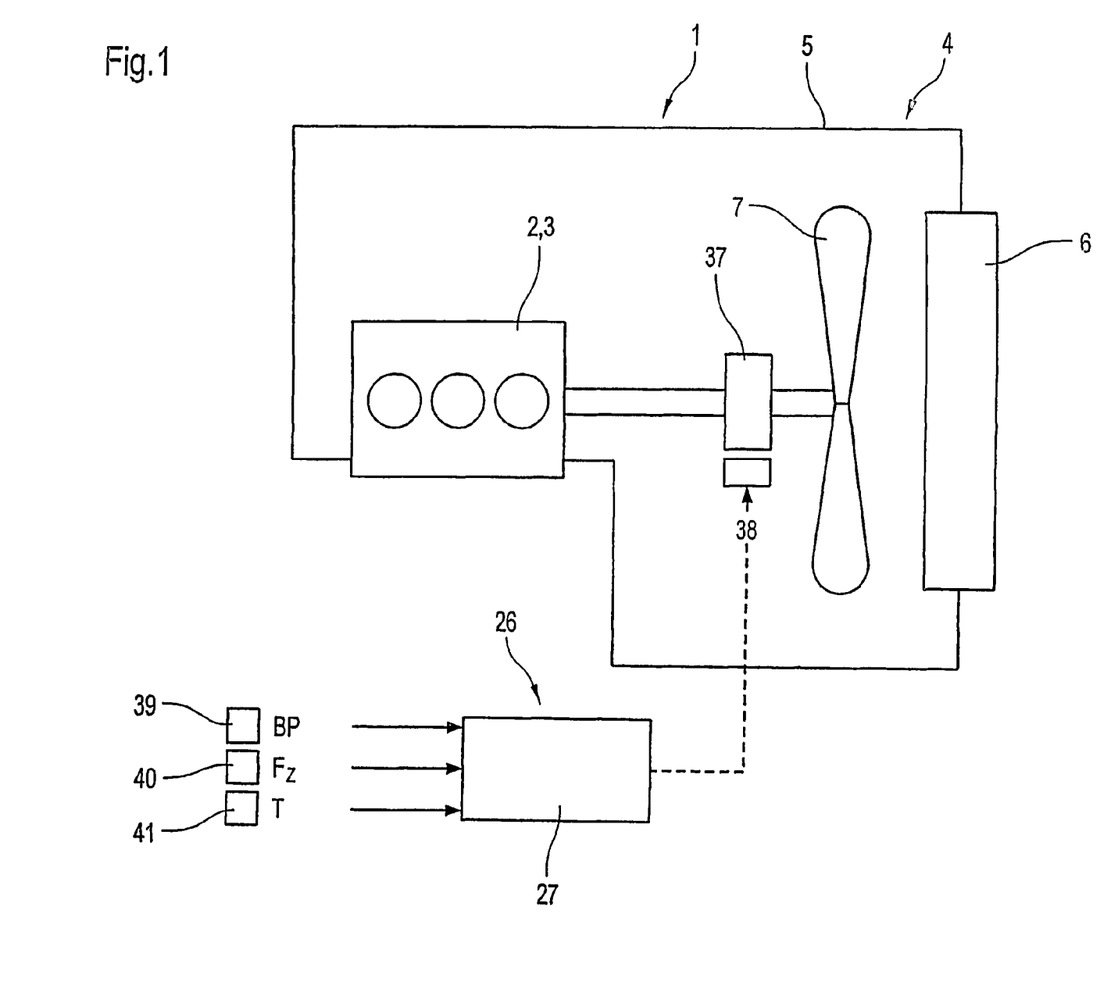
FIG. 1 illustrates, in a schematically strongly simplified depiction, the basic construction of the basic principle of a drive train system designed in accordance with the invention for realizing the method for optimizing the cooling power supply.

FIG. 1 illustrates, in a schematically strongly simplified depiction, on the basis of a section of a drive train system 1, the basic construction of this construction designed in accordance with the invention. The drive train system A1 comprises a driving engine 2, which can be constructed in any way, preferably as an internal combustion engine 3. Associated with the driving engine 2 is a cooling system 4. Said cooling system comprises a coolant circuit 5 for conducting or for carrying cooling media—at least, however, one cooling medium—as well as a cooling device 6 that is associated with the coolant circuit 5. Further provided is a fan 7, which supplies the cooling device 6 with cool ambient air, which absorbs the heat released to it from the cooling medium in the region of the cooling device 6. In this case, the cooling device 6 is arranged in the coolant circuit 5. There exist a large number of possibilities in regard to the construction. It can take the form, for example, of a heat exchanger. The fan 7 is in driveline connection with the driving engine 2. The adjustment, preferably control and/or regulation, of the cooling capacity of the cooling system 4 and thus, at least indirectly, of the temperature of the cooling medium in the coolant circuit 5 is performed through the control and/or regulation of the volume of cool ambient air supplied by way of the fan 7 for absorption of the heat released from the cooling medium after cooling of the assembly. This takes place by way of the control and/or regulation of the speed (rpm) $n_{fan}$ of the fan 7 or of a variable that characterizes the speed (rpm) at least indirectly. Provided in accordance with the invention for controlling and/or regulating the speed (rpm) $n_{fan}$ of the fan 7 in the driveline connection with the driving engine 2 is a controllable or regulatable clutch 37 in the form of a hydrodynamic clutch 8. Said clutch serves for the control of the power that can be transmitted by way of it. Through the control of the transmittable torque by way of the controllable and/or regulatable clutch, when a constant supply of power is supplied by the driving engine, the speed (rpm) $n_A$ at the output of the controllable and/or regulatable clutch 37 is appropriately adjusted. Said speed (rpm) corresponds to or is at least directly proportional to the speed (rpm) $n_{fan}$ of the fan 7. Provided for the realization of the individual control and/or regulation functions is an appropriate control and/or regulation device 26. Said device comprises at least one control and/or regulation device 27, which is understood to refer to the totality of the components that assume the function of a control unit in a decentralized arrangement or else is understood to refer to the control unit itself. The control and/or regulation device 27 is coupled to an adjusting device 38 for setting or changing the transmission ratio of the clutch 37. The setting or changing of the transmission ratio of the clutch 37 is performed in this case as a function of the variables mentioned below:

temperature of the assembly or assemblies to be cooled, in particular the internal combustion engine 3 at least one operating parameter of the driving engine or one variable that characterizes it at least indirectly at least one variable that characterizes, at least indirectly, the functional state of the drive train system or, when the drive train system is used in mobile applications, at least one variable that describes, at least indirectly, the driving state.

The operating parameters of the driving engine are understood here to refer to the variables that characterize, at least indirectly, the functional operation of it, that is, the variables that describe it either directly or by way of other variables that can be derived by way of a functional relation. Included among said variables are, among others, for example, the speed (rpm) $n_{engine}$ of the driving engine 2, the output power $P_{engine}$, the output torque $M_{engine}$, etc. Said variables can be specified, for example, during the construction of the internal combustion engine by the position of the throttle valve or by the injection quantity.

The variables that characterize, at least indirectly, the driving states are understood here to refer to the parameters that act on the power balance of the drive train system. Included among said parameters are both the parameters that currently exist at a point in time t and, in addition, those parameters that aim at a change, and at least the former are to be taken into account. Included among said former parameters are, for example, the variables that characterize the functional operation of a braking device, the power output of the driving engine at the point in time t, a currently engaged gear step, etc. Included among the variables that aim at a change in the driving state are, for example, the actuation of a braking device, in particular the specification of an intent of the driver for producing a braking torque of a specific magnitude, the specification of an intent of the driver for maintaining a constant speed (rpm), the specification of an intent of the driver for changing the power output of the driving engine, etc.; these variables can be present alone or in combination. Provided for registering the individual variables are appropriate registering devices. The registering devices for at least one variable that describes, at least indirectly, an operating parameter BP of the driving engine 2 is indicated by 39, that for registering at least one of the variables that describes, at least indirectly, the driving state FZ is indicated by 40, and that for registering the variable that describes, at least indirectly, the temperature of the driving engine 2 is indicated by 41. The individual registering devices 39 to 41 are coupled to the control device 27, either in a serial manner or in a parallel manner. Corresponding to the cooling capacity need that is to be expected and that can be derived from those variables and depending on the current operating parameters of the driving engine 2, the power of the fan 7 is adjusted by setting and, in particular, controlling the speed (rpm) $n_{fan}$, by way of the controllable and/or regulatable clutch 37, particularly by actuating the adjusting device 38 that is associated with said clutch.

The setting of the speed (rpm) $n_{fan}$ takes place, for example, by
- the control and/or regulation of the filling ratio FG and/or of the flow
- the control and/or regulation of a pathway or, for example, of a pressure for actuation of a control element or in the form of the application of a static superimposed pressure on a working fluid pan that is present.

In accordance with the invention, it is crucial that an adjusting cooling capacity need already be determined in advance, before it can actually adjust itself. The system accordingly responds in advance.

Figure 2:
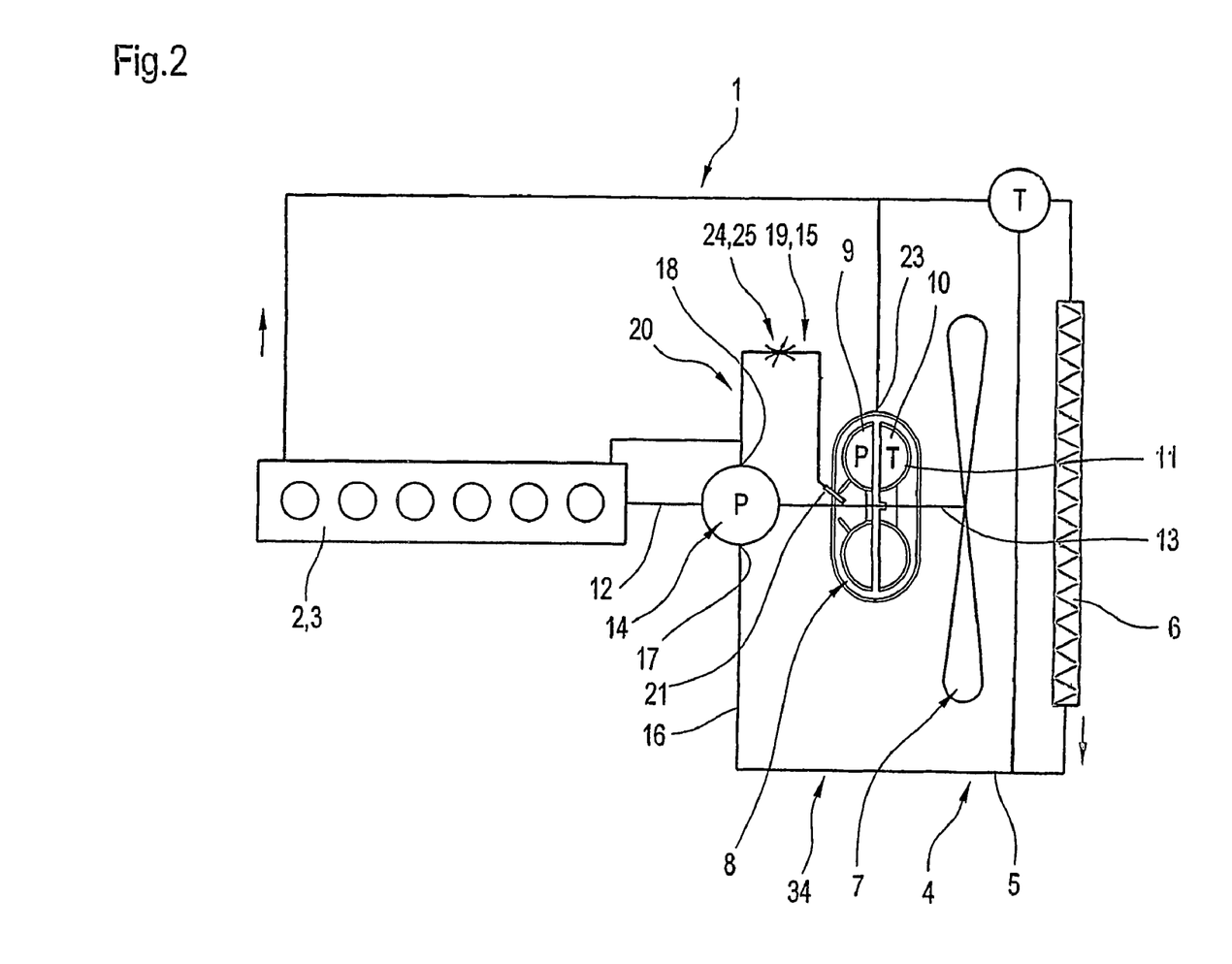
FIG. 2 illustrates, in a schematically simplified depiction, an especially advantageous embodiment of a drive train system designed in accordance with the invention in which the controllable or regulatable clutch takes the form of a hydrodynamic clutch and the cooling system for the driving engine is exploited as working fluid supply system.

FIG. 2 illustrates, in a schematically strongly simplified depiction, on the basis of a section of a drive train system 1 according to FIG. 1, the basic construction of an embodiment that is especially advantageous in accordance with the invention for the implementation of the method of the invention. Therefore, the same reference numbers are used for the same elements. The drive train system 1 comprises a driving engine 2, which is constructed in the form of an internal combustion engine 3. Associated with the driving engine 2, in particular the internal combustion engine 3, is the cooling system 4. Said cooling system comprises a coolant circuit 5 for conducting or for carrying cooling media as well as a cooling device 6 that is associated with the coolant circuit 5. Further provided is a fan 7, which supplies the cooling device 6 with cool ambient air, which, in turn, absorbs the heat. The fan 7 is connected, at least indirectly, to the driving engine 2, in particular the internal combustion engine 3, in a torsionally rigid manner. This means that the fan 7 is in driveline connection with the driving engine 2 or with the internal combustion engine 3, that is, said fan is connected to the latter either in a torsionally rigid manner or by way of intervening transmission elements. In accordance with the invention, for the control and/or regulation of the power of the fan 7, this power being characterized particularly as a function of the speed (rpm) or else directly of the speed (rpm) $n_{fan}$ of the fan 7, a hydrodynamic clutch 8 is arranged, as a regulatable clutch 37, in the driveline connection with the driving engine 2 or with the internal combustion engine 3. This hydrodynamic clutch 8 is disposed after the driving engine 2 or the internal combustion engine 3 and the fan 7 when viewed in the direction of power transmission. The setting, that is, at least the control of the speed (rpm) $n_{fan}$ of the fan 7 is performed by way of changing the filling ratio FG of the hydrodynamic clutch 8. The hydrodynamic clutch 8 thus involves a flow-regulated hydrodynamic clutch or, according to an especially advantageous design, a flow-regulated hydrodynamic clutch. The hydrodynamic clutch 8 comprises a primary wheel 9, which functions as an impeller, and a secondary wheel 10, which functions as a turbine, which jointly form a working chamber 11, which can be filled with working fluid. The primary wheel 9 is connected here, at least indirectly, that is, either directly or else by way of further transmission means, to the crankshaft 12 of the internal combustion engine 3. The secondary wheel 10 is connected, at least indirectly, that is, either directly or by else way of further transmission means, to the fan 7, in particular to the fan drive shaft 13. In regard to the supply of the hydrodynamic clutch 8 with working fluid, there exist a large number of possibilities. In accordance with an especially advantageous embodiment according to FIG. 2, the hydrodynamic clutch 8 is supplied with working fluid from the cooling system 4 of the driving engine 2. The cooling system 4 or parts of it form or are a component part of a working fluid supply system 34 associated with the hydrodynamic clutch 8. Provided here for circulating the coolant in the coolant circuit 5 is a coolant circulating pump 14. Said circulating pump serves to maintain the flow circulation in the coolant circuit 5 and is preferably coupled to the driving engine 2. In the case depicted, said pump is arranged between the driving engine 2 and the hydrodynamic clutch 8. The speed (rpm) of the drive shaft is thus always linked to the speed (rpm) of the driving engine 2, particularly to the speed (rpm) of the crankshaft 12. When the hydrodynamic clutch 8 is supplied with coolant from the cooling circuit 5 as operating fluid, the hydrodynamic clutch 8 is arranged in a bypass 15 to the coolant circuit 5. The coolant circuit 5 forms here a first coolant-carrying part 16 between an outlet 18 and an inlet 17 to the coolant circulating pump 14. The second coolant-carrying part 19 takes the form of a bypass 15 and serves to supply working fluid to the hydrodynamic clutch 8. The bypass 15 comprises at least a first bypass subline 20 and a second bypass subline 22. The first bypass subline 20 connects the outlet 18 of the coolant circulating pump 14 to the inlet 21 of the hydrodynamic clutch 8, the latter being connected directly or indirectly by way of further lines or ports to the working chamber 11 of the hydrodynamic clutch 8. The second bypass subline 22 connects at least one outlet 23 of the hydrodynamic clutch 8 to the inlet line 17 to the coolant circulating pump 14. Here, the coupling to the outlet 23 or with a number of such outlets to the working chamber 11 occurs, for example, by way of outlet openings. Arranged here between the coolant circulating pump 14 and the inlet 21 of the hydrodynamic clutch 8 for adjusting the filling ratio FG is a valve device 24, in which it is possible at least to control the flow-through quantity. The valve device 24 is designed here as an adjustable valve device, preferably in the form of a proportional valve 25. The supply of the working chamber 11 of the hydrodynamic clutch 8 with working fluid in the form of coolant from the coolant circuit 5 of the driving engine 2, the coupling of the clutch 8 to the coolant circuit 5 between the outlet 18 and the inlet 17 of the coolant circulating pump 14 by way of the bypass 15, and the provision of a controllable valve device 24 in the flow direction between the coolant circulating pump 14 and the hydrodynamic clutch 8 makes it possible, in a simple way, through actuating of the valve device 24, to control or, given feedback of a corresponding signal, also to regulate the flow through the hydrodynamic clutch 8 and thus, on account of the change in filling ratio, to adjust the speed (rpm) of the secondary wheel 10 or of the fan 7 that is coupled to the secondary wheel 10 of the hydrodynamic clutch 8 and, in accordance with an especially advantageous construction, to regulate this speed (rpm). This system is characterized here by a small additional expense in design as well as in control engineering and is optimized in regard to the structural components that are additionally required. Furthermore, in the case of this solution for the working fluid supply system 34 for the hydrodynamic clutch 8, recourse is had to the cooling system 4, which, in any case, already exists, and, in particular, to the coolant circuit 5. The coolant circuit 5 itself can be constructed here as an open circuit or as a closed circuit. There exist no restrictions in this respect. In the case of the advantageous embodiment depicted in FIG. 2, the coolant circuit 5 takes the form of a closed circuit.

Figure 3A:
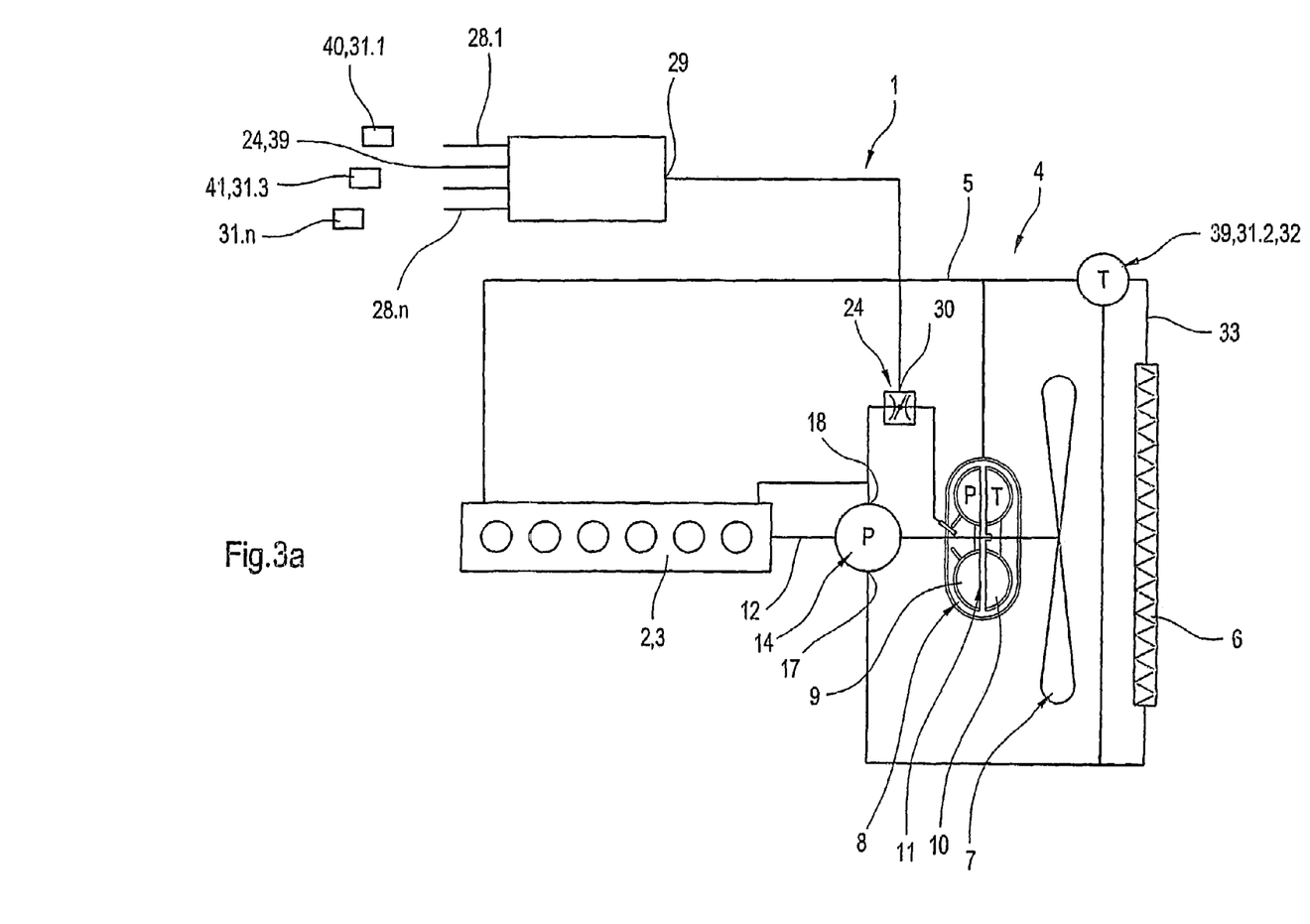
FIGS. 3a and 3b illustrate, in a schematically simplified depiction for the construction according to FIG. 2, the control and the regulation of the fan speed (rpm), based on a block diagram.

By means of the solution of the invention, there exists the possibility of adjusting the cooling capacity of the fan 7, which is essentially determined by its speed (rpm) $n_{fan}$ and can thus be influenced by said speed (rpm), independently of the speed (rpm) $n_{engine}$ of the driving engine 2. In accordance with the invention, the adjustment of the speed (rpm) $n_{fan}$ of the fan 7 is performed as a function of the operating parameters of the drive train system 1, so that the temperature in the cooling system 4 is maintained, without having to adjust downward or upward the driving engine, in particular the internal combustion engine 3, by being able to adjust the cooling capacity delivered by way of the fan 7 already prior to the rise or drop in the temperature of the cooling medium in the cooling circuit 5, owing to the change in the operating parameters. This offers the advantage that, on the one hand, the temperature of the internal combustion engine 3 remains essentially constant and, further, the energy consumption for the cooling is optimized. Understood as operating parameters of the drive train system 1 in this case are the temperatures of the components or of the assemblies that are to be cooled by means of the coolant circuit 5, in particular the driving engine 2, and possibly, when a retarder is provided here, which is not depicted in detail, its temperature as well as the variables that characterize, at least indirectly, the operating states of the driving engine 2 and of the vehicle. Included among these variables are, among others, the possible actuation of a retarder, the characteristic values characterizing the power output of the driving engine, such as, for example, the speed (rpm) $n_{engine}$, the torque $M_{engine}$, the engaged gear step in the case when the driving engine 2 is coupled with a gearbox unit, as well as the characteristic variables existing at the power take-off, in particular the power take-off from the gearbox unit, such as, for example, $n_{power\ take-off}$, $M_{power\ take-off}$. The possibility of controlling the speed (rpm) $n_{fan}$ of the fan 7 is presented in FIG. 3a. The basic construction of the drive train system 1 corresponds to that described in FIG. 2, for which reason the same reference numbers are used for the same elements. Associated with said drive train system is a control device 26, comprising a control device 27, which, preferably, takes the form of a control unit, in particular an ECU. Said control device comprises at least one input 28 and, in the case depicted, a number of inputs 28.1 to 28.n and at least one output 29, which is connected to the adjusting device 30 of the valve device 24. The input 28 in the case of serial data transmission or the outputs 28.1 to 28.n in the case of parallel data transmission are each connected to devices 31.1 to 31.n for registering operating parameters of the drive train system 1, in particular 39 for registering a variable that describes, at least indirectly, the temperature of the assembly that is to be cooled, 40 for registering at least one variable that describes, at least indirectly, the operating state of the driving engine 2, and 41 for registering at least one variable that characterizes, at least indirectly, the driving state. In the case depicted, what is involved in the case of the device 31.1, for example, is the device 40 for registering a variable that characterizes, at least indirectly, the speed (rpm) of the driving engine 2, $n_{engine}$, in the case of the device 31.2, the device 39 for registering a variable that characterizes, at least indirectly, the temperature of the driving engine in the form of the temperature in the coolant circuit 5, and, in the case of the device 31.3, at least one device 41 for registering a variable that characterizes, at least indirectly, the driving state. The device 31.2 is here preferably constructed as a thermostat 33, which is arranged in the coolant circuit and is arranged preferably in the inlet 33 to the cooling device 6. Depending on the currently determined speed (rpm) of the driving engine, $n_{engine}$, as well as the current driving state and the temperature T that is determined currently in the coolant circuit 5, it is possible to deduce a change in the cooling capacity required by the coolant circuit 5, in particular a possible increase or decrease in the temperature in the coolant circuit 5 on account of the current circumstances. Depending on this change in the coolant temperature, $\Delta T$, which can be determined, that is, preferably calculated, there then ensues the actuating of the hydrodynamic clutch 8, in particular the specification of the filling ratio FG to be adjusted by actuating of the valve device 24, in particular its adjusting device 30, in order to attain the required power that can be supplied by the fan 7 for providing the cooling capacity in the coolant circuit 5. In this case, the valve device 24 functions as the adjusting device 30 for adjusting the filling ratio FG in the working chamber 11. When it is desired to maintain the temperature of the driving engine 2, it is necessary to derive the changes $\Delta T_{coolant,\ theoretical}$ in the temperature $T_{coolant}$ in the coolant circuit 5 that ensue from the operating parameters. The magnitude of the manipulated variable for actuating the fan 7 is generated from this adjusting change in order to keep constant the cooling level in the cooling circuit 5. Determined to this end for the output of the required cooling capacity $P_{fan}$ is a specified value, which is proportional to the speed (rpm) $n_{fan,\ specified}$. Here, for control of the coolant temperature in the coolant circuit, $T_{coolant}$, the speed (rpm) $n_{fan}$ of the fan 7 is controlled. Serving as a manipulated variable for the control of the speed (rpm) of the fan $n_{fan}$, which corresponds to the speed (rpm) $n_{clutch}$ at the output of the hydrodynamic clutch 8, that is, the turbine 10, or which is functionally related to said speed (rpm) and, preferably, is directly proportional to said speed (rpm), is the filling ratio FG of the hydrodynamic clutch 8, which, in turn, is adjusted by way of the valve device 24. The filling ratio FG describes here the torque $M_{clutch}$ that can be transmitted by way of the clutch 8, this torque determining, as a function of the speed (rpm) $n_{engine}$ of the driving engine 2, the power $P_{clutch}$ that can be transmitted by way of the clutch 8. A corresponding block diagram is depicted in FIG. 3b.

Figures 3B, 4:
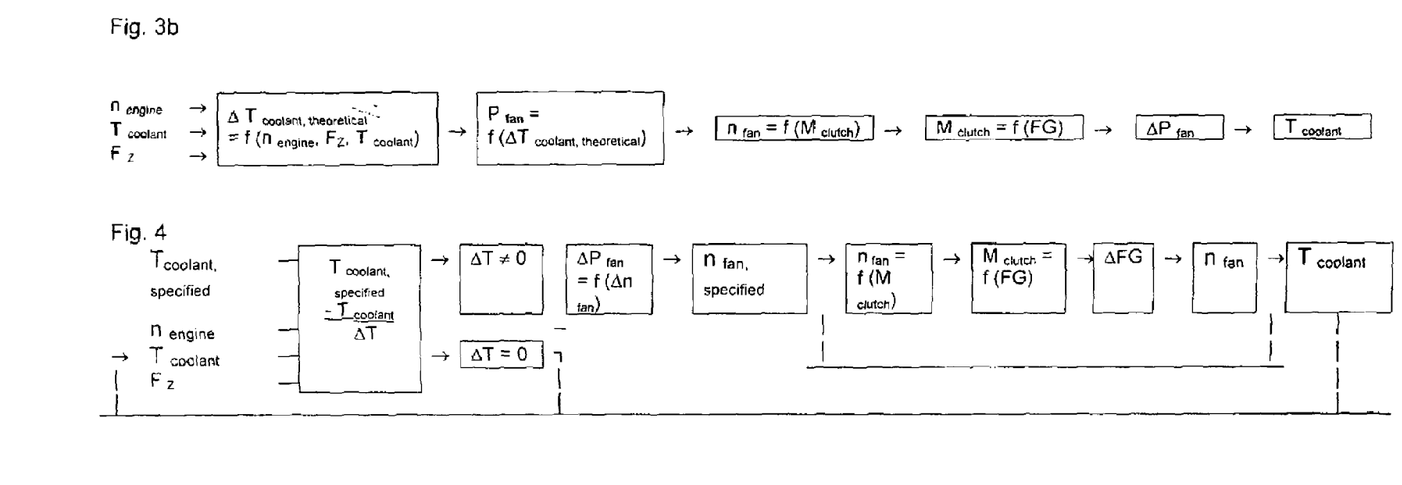
FIG. 4 illustrates, on the basis of a block diagram according to FIG. 3b, the possibility of regulating the temperature of the driving engine.

FIG. 4 illustrates, on the basis of a block diagram according to FIG. 3b, the possibility of regulating the temperature of the driving engine, $T_{engine}$, to constant temperature by regulating the temperature in the coolant circuit 5, $T_{coolant}$. The temperature of the coolant $T_{coolant}$ constitutes here the variable that characterizes, at least indirectly, the temperature of the driving engine, $T_{engine}$. This temperature is continuously monitored and, when a deviation of the actual value $T_{engine}$ or $T_{coolant}$ from the specified value $T_{engine,\ specified}$ or $T_{coolant,\ specified}$, $\Delta T$, occurs, the actuating of the fan 7, as an adjusting device for the regulation of the constant temperature of the engine or of the coolant, takes place, in particular the adjustment of the required speed (rpm) $n_{fan,\ specified}$. When this occurs, the speed (rpm) of the fan $n_{fan}$ is preferably regulated by determining the actual value $n_{fan}$ continuously or at intervals in time and comparing it with the specified value $n_{fan,\ specified}$ that results from the temperature deviation and is to be adjusted. In correspondence to the actuating deviation, a change is then made in the filling ratio FG of the hydrodynamic clutch 8 until a deviation of 0 is attained. The adjustment of the filling ratio FG then is performed by way of actuating the valve device 24, which determines the flow-through quantity in the bypass 15. The control or, in the case of feedback, the regulation of the speed (rpm) of the fan 7 is a component of a control and/or regulation of the temperature of the coolant or of a variable that characterizes this temperature at least indirectly. In this construction, the regulation of the speed (rpm) of the fan 7 is integrated into the regulation to constant coolant temperature. However, it is also conceivable to integrate the speed (rpm) regulation into the control according to FIG. 3b. Furthermore, only one control of the fan speed (rpm) may be used for regulation of the coolant temperature.

Figure 5A:
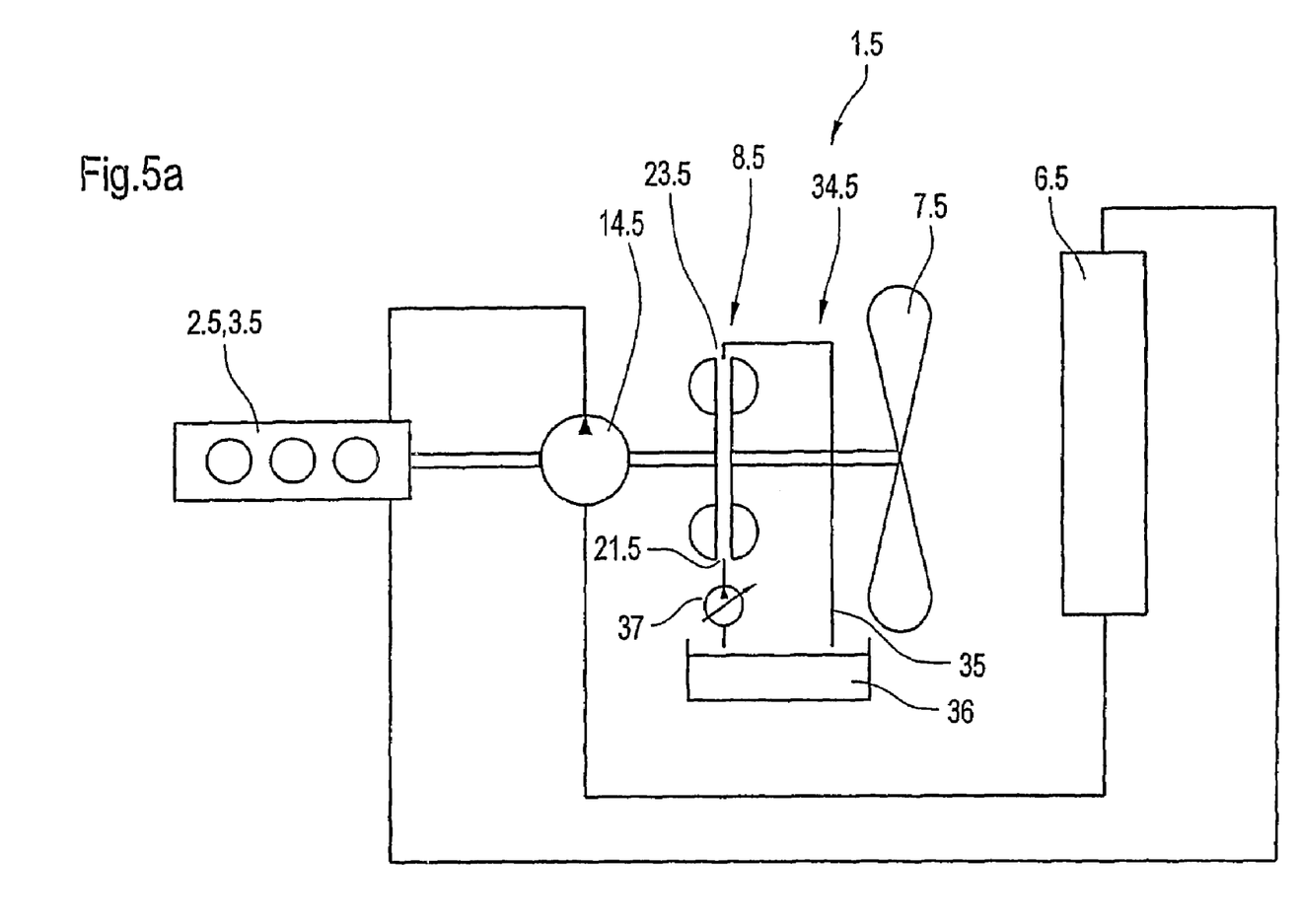
FIGS. 5a and 5b illustrate, in a schematically strongly simplified depiction, two further possibilities for controlling the output power of the fan by way of a clutch having a separate working fluid supply system.
Figure 5B:
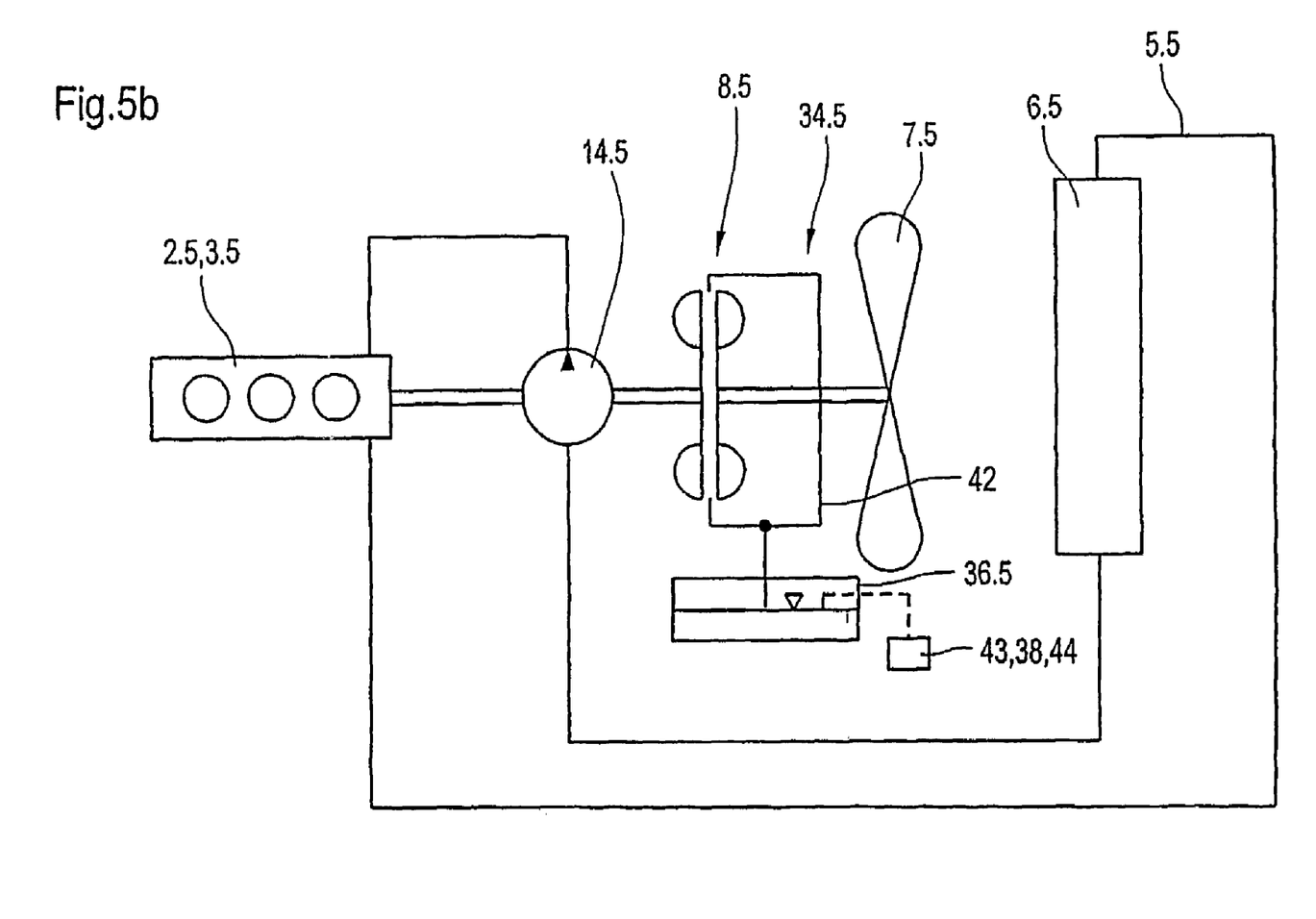

FIGS. 5a and 5b illustrate, in a schematically strongly simplified depiction, two further possibilities for controlling the cooling power $P_{fan}$ that can be output from the fan 7.5 by control or regulation of the speed (rpm) of the fan 7.5 by use of the hydrodynamic clutch 8.5 to this end. Here, however, said clutch is associated with its own working fluid supply system 34.5, independent of the coolant circuit 5.5. The coolant circuit 5.5 of the driving engine 2 corresponds here to that described in FIG. 2, but is free of a bypass with a hydrodynamic clutch 8.5 arranged therein. The same reference numbers are used for the same elements. The working fluid supply system 34.5 of the hydrodynamic clutch 8.5 can be designed in various ways. In the case depicted here, an open circuit 35 is used. Said circuit comprises a working fluid reservoir 36, which is connected by way of corresponding connecting lines to at least one inlet 21.5 and one outlet 23.5 of the hydrodynamic clutch 8.5. This system is characterized by a constant outlet opening in the hydrodynamic clutch. In this system, the filling ratio of the hydrodynamic clutch 8.5 changes with a change in the supplied flow of fluid. This change is adjusted by way of a cooling pump 37, which is disposed after the working fluid reservoir 36 in the flow direction to the working chamber 11 of the hydrodynamic clutch 8. Although this system differs in design from that described in FIG. 1, it is possible to perform the same control and regulation operations with this system. Crucial is the fact that, for controlling the power output of the fan 7, the use of a hydrodynamic clutch having a variable filling ratio occurs. In contrast to this, the construction according to FIG. 5b illustrates a construction of the working fluid supply system 34.5 having a closed circuit 42, which is connected in a pressure-tight manner to a working fluid reservoir 36.5. Provided for here are means 43 for producing a static superimposed pressure on the working medium level in the reservoir, said means constituting the adjusting device 38 of the clutch 8.5 for changing the power transmission behavior, particularly for changing the transmittable torque, in the form of means 44 for changing the filling ratio.

Figure 6:
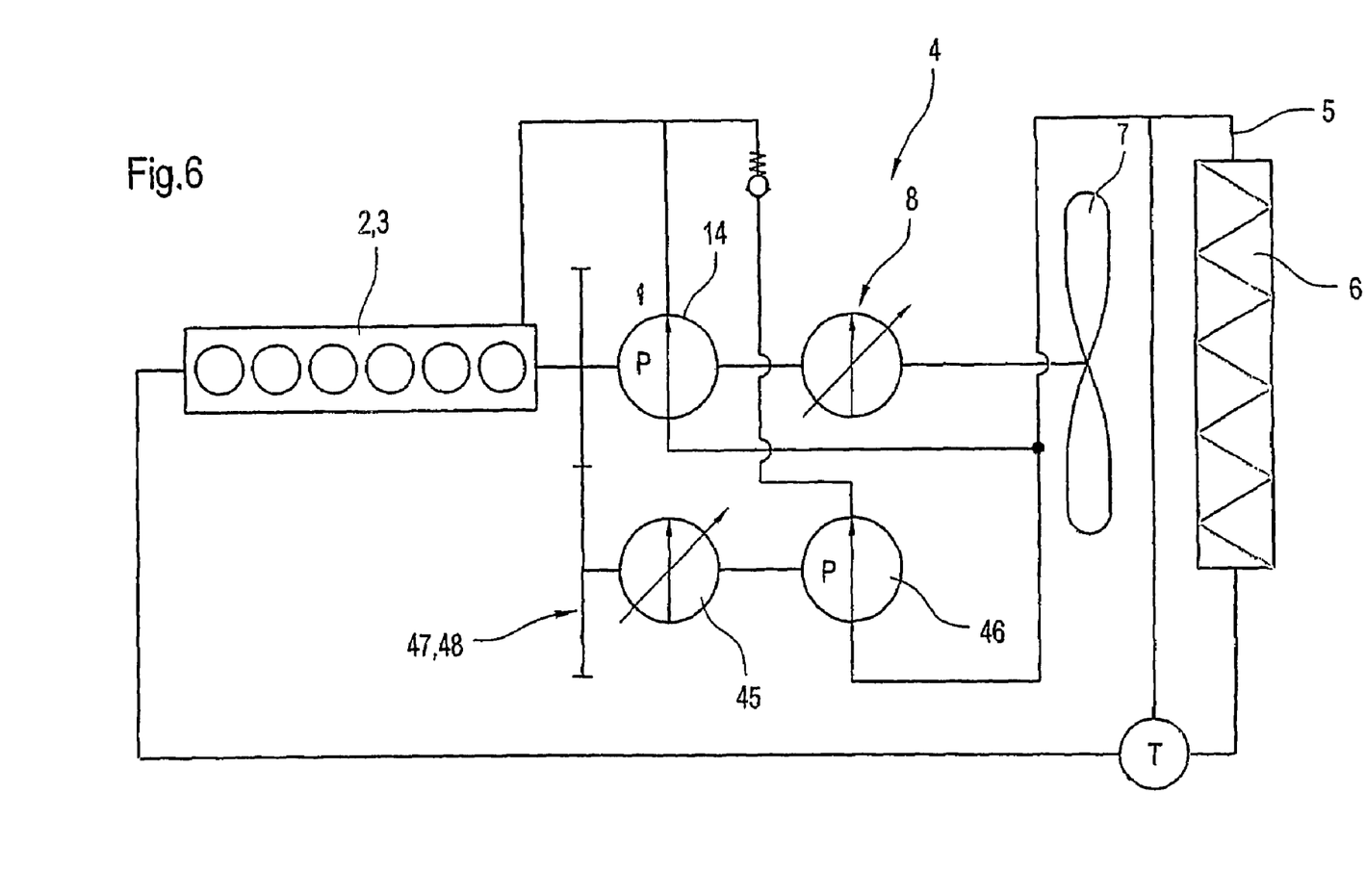
FIG. 6 illustrates a further development according to FIG. 2, having an additional coolant circulating pump.

FIG. 6 illustrates, in a schematically simplified depiction, a further development according to FIG. 2, in which here is arranged in the coolant circuit an additional coolant circulating pump 46, which can be driven by way of a controllable or regulatable clutch 45 of any construction. Said pump is further coupled to the driving engine 2 by way of a speed/torque converter 47 in the form of a spur wheel set 48. This solution offers the advantage of a free adjustability of the supplied quantity of the coolant circulating pump 46, independent of the speed (rpm) of the driving engine 2.

LIST OF REFERENCE NUMBERS 1, 1.5 drive train system
2, 2.5 driving engine
3, 3.5 internal combustion engine
4, 4.5 cooling system
5, 5.5 coolant circuit
6 cooling device
7, 7.5 fan
8, 8.5 hydrodynamic clutch
9 primary wheel
10 secondary wheel
11 working chamber
12 crankshaft
13 fan drive shaft
14 coolant circulating pump
15 bypass
16 first coolant-carrying part
17 inlet
18 outlet
19 second coolant-carrying part
20 first bypass subline
21, 21.5 inlet
22 second bypass subline
23, 23.5 outlet
24 valve device
25 proportional valve
26 control device
27 control device
28.1 to
28.n Input
29 Output
30 adjusting device of the valve
31.1 to
31.n device for registering the operating parameters
31.1 device for registering a variable that characterizes, at least indirectly, the speed (rpm) of the driving engine, $n_{engine}$
31.2 device for registering a variable that characterizes, at least indirectly, the temperature in the coolant circuit 5
31.3 device for registering a variable that characterizes, at least indirectly, the driving state
32 Thermostat
33 Inlet
34, 34.5 working fluid supply system of the hydrodynamic clutch
35 open circuit
36 operating fluid reservoir
37 Controllable and/or regulatable clutch
38 adjusting device
39 device for registering a variable that describes, at least indirectly, an operating parameter BP of the driving engine
40 device for registering a variable that describes, at least indirectly, the driving state FZ of the driving engine
41 device for registering a variable that characterizes, at least indirectly, the temperature of the driving engine
42 closed circuit 43 means for applying a static superimposed pressure on the working fluid level
44 means for changing the filling ratio
45 adjustable clutch
46 second coolant circulating pump
47 speed/torque converter
48 spur wheel set
49 means for influencing the transmission behavior of the hydrodynamic clutch
$n_{engine}$ speed (rpm) of the driving engine
$n_{fan}$ speed (rpm) of the fan
$T_{coolant}$ Temperature of the coolant circuit
$T_{coolant,\, specified}$ specified value of the coolant temperature
$\Delta T$ actuating deviation of the coolant temperature
$P_{fan}$ cooling power output by the fan
$n_{fan,\, specified}$ specified value of the fan speed (rpm)
$n_{fan,\, actual}$ actual value of the fan speed (rpm)

The invention claimed is:

1. A drive train system comprising:
a driving engine;
a cooling system for cooling the driving engine, wherein the cooling system comprises a coolant circuit, a cooling device and a fan in thermal communication with the cooling device, wherein the fan is powered by the driving engine;
a clutch operably connected to the driving engine and the fan, wherein the controllable clutch is a hydrodynamic clutch comprising a primary wheel and a secondary wheel which define a working chamber;
a working fluid supply system in fluid communication with the working chamber for supplying a working fluid thereto; and
a clutch controller for controlling the hydrodynamic clutch, wherein the working fluid supply system comprises a circuit that is coupled to the working chamber and has a filling controller for controlling a filling ratio in the working chamber, and wherein the circuit is a closed circuit having a pressure-tight seal with a pressure-tight closed working fluid reservoir and the filling controller applies a static superimposed pressure on the working fluid in the working fluid reservoir.

2. A drive train system comprising:
a driving engine;
a cooling system for cooling the driving engine, wherein the cooling system comprises a coolant circuit, a cooling device and a fan in thermal communication with the cooling device, wherein the fan is powered by the driving engine;
a controllable clutch operably connected to the driving engine and the fan, wherein the controllable clutch is a hydrodynamic clutch comprising a primary wheel and a secondary wheel which define a working chamber;
a working fluid supply system in fluid communication with the working chamber for supplying a working fluid thereto; and
a clutch controller for controlling the hydrodynamic clutch, wherein the working fluid supply system is defined at least in part by the cooling system, wherein the hydrodynamic clutch is downstream of a first circulating pump of the cooling system, wherein the hydrodynamic clutch is positioned along a bypass to the coolant circuit, and wherein the coolant circuit further comprises a valve device for adjusting the clutch and controlling flow of working fluid into the working chamber of the hydrodynamic clutch.

3. The drive train system of claim 2, further comprising: a regulating device having registering devices coupled to the regulating device for monitoring at least one current operating parameter of the driving engine, an operating state of the drive train system or a temperature in the coolant circuit, wherein the regulating device is connected to an adjusting device of the clutch for adjusting transmittable torque.

4. The drive train system of claim 2, wherein the valve device is positioned along the bypass.

5. The drive train system of claim 2, wherein the valve device is a proportional valve.

6. The drive train system of claim 2, further comprising:
a second circulating pump in the cooling circuit upstream of the first circulating pump, wherein the second circulating pump is coupled between the driving engine and the clutch by a speed/torque converter, and wherein the second circulating pump is adjustable.

7. The drive train system of claim 6, wherein adjustability of the second circulating pump is controlled by a regulatable clutch that is in a driveline connection between the driving engine and the second circulating pump.

8. The drive train system of claim 7, wherein the regulatable clutch is a hydrodynamic clutch.

9. The drive train system of claim 2, wherein the working fluid supply system comprises a circuit that is coupled to the working chamber and has a filling controller for controlling a filling ratio in the working chamber.

10. The drive train system of claim 9, wherein the circuit is a closed circuit having a pressure-tight seal with a pressure-tight closed working fluid reservoir and the filling controller applies a static superimposed pressure on the working fluid in the working fluid reservoir.

* * * * *